1

United States Patent
McGowan et al.

(10) Patent No.: US 9,747,330 B2
(45) Date of Patent: Aug. 29, 2017

(54) DEMOGRAPHIC DETERMINATION FOR MEDIA CONSUMPTION ANALYTICS

(71) Applicant: Brightcove Inc., Boston, MA (US)

(72) Inventors: Albert John McGowan, Phoenix, AZ (US); Matthew A. Johnson, Tempe, AZ (US)

(73) Assignee: Brightcove Inc., Boston, MA (US)

( * ) Notice: Subject to any disclaimer, the term of this patent is extended or adjusted under 35 U.S.C. 154(b) by 33 days.

(21) Appl. No.: 13/841,497

(22) Filed: Mar. 15, 2013

(65) Prior Publication Data

US 2014/0280270 A1   Sep. 18, 2014

(51) Int. Cl.

| G06F 17/30 | (2006.01) |
|---|---|
| H04N 21/258 | (2011.01) |
| H04N 21/442 | (2011.01) |
| H04N 21/25 | (2011.01) |
| H04N 21/4223 | (2011.01) |

(52) U.S. Cl.
CPC ..... *G06F 17/30386* (2013.01); *H04N 21/251* (2013.01); *H04N 21/25883* (2013.01); *H04N 21/44218* (2013.01); *H04N 21/44222* (2013.01); *H04N 21/4223* (2013.01)

(58) Field of Classification Search
CPC ... G06F 17/30864; G06Q 10/10; G06Q 30/02
USPC ........................................................ 707/758
See application file for complete search history.

(56) References Cited

U.S. PATENT DOCUMENTS

| 7,343,417 | B2 * | 3/2008 | Baum | 709/228 |
|---|---|---|---|---|
| 8,010,402 | B1 * | 8/2011 | Sharma et al. | 705/7.29 |
| 8,843,951 | B1 * | 9/2014 | Sherrets et al. | 725/14 |
| 2003/0122839 | A1 * | 7/2003 | Matraszek | G06F 17/30265 345/581 |
| 2009/0193097 | A1 * | 7/2009 | Gassewitz | G06F 15/173 709/218 |
| 2009/0210902 | A1 * | 8/2009 | Slaney | H04H 60/45 725/34 |
| 2010/0043024 | A1 | 2/2010 | Huang et al. | |
| 2010/0046797 | A1 | 2/2010 | Strat et al. | |
| 2010/0162301 | A1 | 6/2010 | Minnick | |
| 2011/0023060 | A1 | 1/2011 | Dmitriev et al. | |
| 2011/0209066 | A1 | 8/2011 | Sakata et al. | |

(Continued)

FOREIGN PATENT DOCUMENTS

EP   1 557 810 A2   7/2005

OTHER PUBLICATIONS

International Search Report and Written Opinion mailed Jul. 29, 2014 for PCT/US2014/024782 filed on Mar. 12, 2014, 10 pages.

(Continued)

*Primary Examiner* — Scott A Waldron
*Assistant Examiner* — Dongming Wang
(74) *Attorney, Agent, or Firm* — Kilpatrick Townsend & Stockton LLP

(57) ABSTRACT

A system, method and apparatus are disclosed which may be used to provide demographic and behavior data of a user of a video service provider. The user demographic information may be obtained by obtaining an image of the user, analyzing the image data, and providing the information about the determined demographic data. Behavior data may be obtained from at least one sensor monitoring user actions and correlating the user actions with video content being provided to the user.

20 Claims, 6 Drawing Sheets

(56) References Cited

U.S. PATENT DOCUMENTS

| | | |
|---|---|---|
| 2012/0019643 A1 | 1/2012 | Gideon et al. |
| 2012/0110027 A1* | 5/2012 | Falcon .......................... 707/802 |
| 2012/0136728 A1 | 5/2012 | Hsiung et al. |
| 2012/0140069 A1 | 6/2012 | Ding et al. |
| 2012/0259710 A1 | 10/2012 | Peterson |
| 2014/0156676 A1* | 6/2014 | Brust ................ G06F 17/30554 707/748 |
| 2014/0373046 A1* | 12/2014 | Franji ............................ 725/34 |

OTHER PUBLICATIONS

International Preliminary Report on Patentability for PCT/US2014/024782 issued Sep. 15, 2015, all pages.

\* cited by examiner

DEMOGRAPHIC DETERMINATION FOR MEDIA CONSUMPTION ANALYTICS

BACKGROUND

Providers of video and media services and content benefit from knowing demographic information about their users in order to provide programming and content more suited to each user. With traditional over-the-air broadcasting systems, however, it is not possible to obtain data about an individual user. A provider might use transmission systems, such as DSL, cable and satellite delivery systems, which allow for some user information to be sent back from a user to the provider. Even so, for the user information to be returned to the provider specific actions would need to be undertaken by the user, which limits its utility.

SUMMARY

This Summary does not in any way limit the scope of the claimed subject matter.

Video and media service providers may be able to obtain demographic information of at least one user in the case that the user's media display device is equipped to capture and relay information from an image of the user. The captured image may be analyzed to infer from it data comprising physical and behavioral attributes of the user. The user's attributes may be compared to stored information about attributes of various demographic types. From the comparison it may be possible to determine, to varying levels of confidence, to which demographic type a user belongs. Demographic information or statistical data based on the user's determined demographic type may be provided and may be used to adjust the video and/or media content provided to the user.

One embodiment of a method of providing demographic information regarding one or more users of a display device comprises obtaining user data from image data of the one or more users, analyzing the user data with a processing unit, and providing demographic information incorporating the demographic type of at least one user. In the embodiment, analyzing the user data from the at least one image includes accessing stored information regarding a demographic type, comparing the user data to the accessed stored information regarding a demographic type and determining a demographic type of the at least one user of the one or more users.

An embodiment of a system for providing demographic information regarding one or more users of a display device includes one or more processors and non-transitory storage media communicatively coupled with and readable by the one or more processors and comprising instructions, which when executed by the one or more processors, cause the one or more processors to obtain user data from image data of the one or more users, analyze the user data using the one or more processors, and provide demographic information incorporating the demographic type of the at least one user. In this embodiment analyzing the user data from the image data includes accessing stored information regarding a demographic type, comparing the user data to the accessed stored information regarding the demographic type, and determining a demographic type of the at least one of the one or more users.

An embodiment of a computer program product embodied on a computer-readable medium includes code that, when executed, causes one or more processors to obtain user data from image data of one or more users, analyze the user data using the one or more processors, and provide information incorporating the demographic type of at least one user of the one or more users. In this embodiment analyzing the user data from image data includes accessing stored information regarding a demographic type, comparing the user data to the accessed stored information regarding the demographic type, and determining a demographic type of at least one user.

DESCRIPTION OF THE DRAWINGS

A further understanding of the nature and advantages of various embodiments may be realized by reference to the following figures. The following figures only illustrate exemplary embodiments to help understand the disclosure given in the Detailed Description, and are not intended to illustrate limitations of the embodiments.

In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
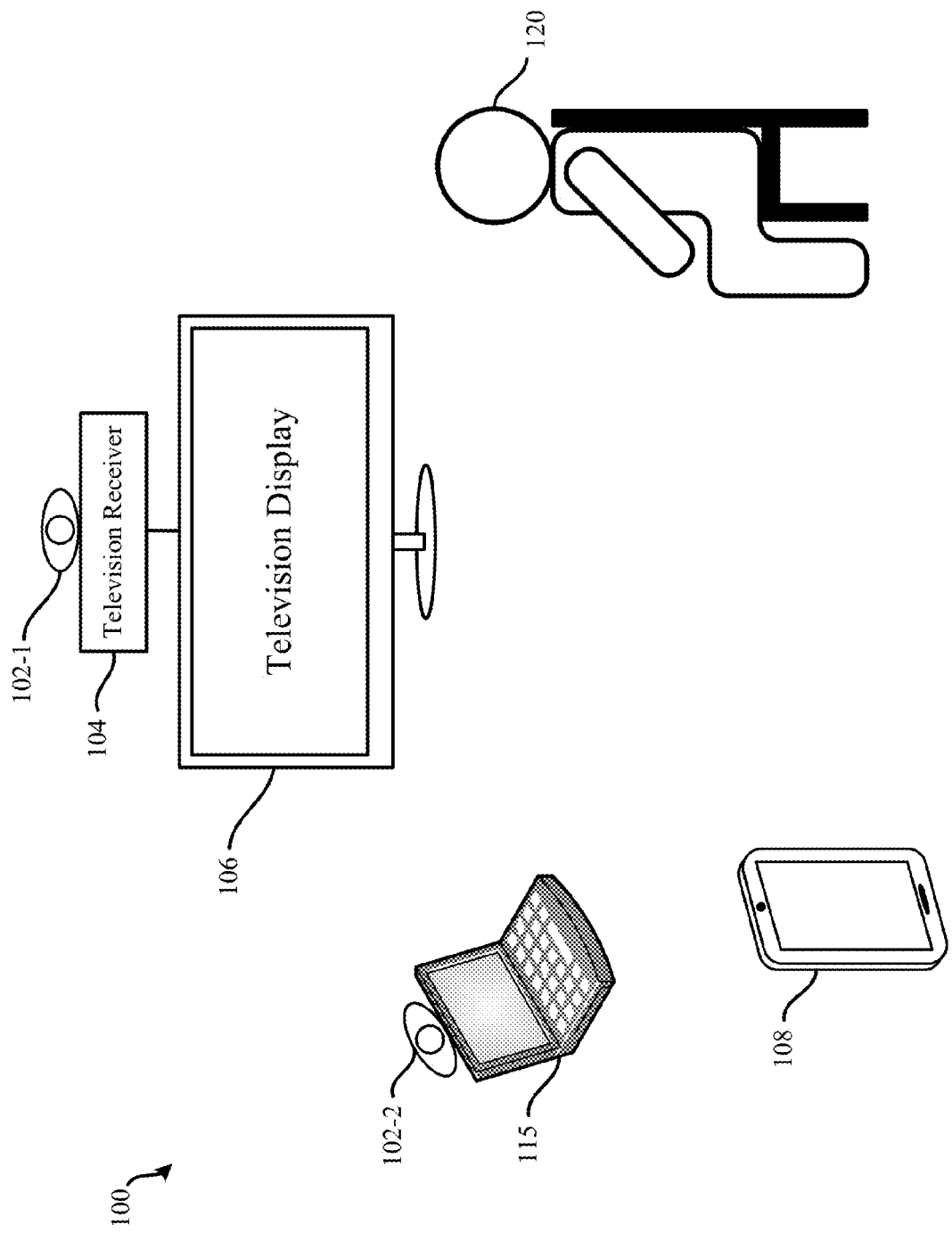
FIG. 1 illustrates a user and a plurality of display devices.

The present disclosure is directed to methods, systems and devices for determining demographic information about at least one user of a video or other media service.

In the description and claims that follow, the word "a" or "an" preceding an element does not exclude the presence of a plurality of such elements.

As a convenience, a non-exhaustive list of acronyms and terms used herein is provided. The detailed meaning of each acronym or term is given in subsequent paragraphs.

API Application Programming Interface
DSL Digital Subscriber Line
MSP Media service provider In a media servicing system, video and other media content can be delivered to an end user device (e.g., mobile phone, tablet, personal computer, portable media device, set-top box, video game system, television, etc.) which can provide media playback to an end user. The media content can be provided via a data communications networks, such as a distribution network for television content, the internet, etc. The media content can be generated and/or originated by content providers and/or advertising networks, hosted on media file delivery service providers, and/or processed and syndicated to end user devices by a cloud-hosted integrated multi-node pipelining system (CHIMPS) as described in more detail in U.S. patent application Ser. No. 13/742,510, entitled "Advertising Processing Engine Service," which is incorporated by reference herein in its entirety. Any or all of these entities of a media servicing system can be a media service provider (MSP) as described herein.

A media servicing system can collect information about media content being consumed by users, and provide analytics to content providers to determine the popularity of certain content, as well as user behavior related to that content (e.g., when a user alters playback by stopping, pausing, skipping, rewinding, etc.). Although behavioral information from this type of activity can be detected, little may be known about the identity of one or more users consuming the media content. Embodiments herein, however, can enable MSPs and/or other entities to utilize cameras to gather demographic information regarding one or more users consuming media content. This demographic information can be incorporated into an MSPs analytic reporting and/or used to inform and update models on demographic preferences (by, for example, determining how certain demographics react to certain media content). Additionally or alternatively, embodiments provide for individual identification to allow for adaptive content based on individual preferences.

In the case that MSPs are able to obtain information about individual users, the providers may be able to adjust the services and content (requested media, advertisements, etc.) specifically for each individual user. Two non-limiting examples comprise including advertisements in the services based on a user's hobbies, or preventing violent video scenes from being displayed to an underage user. Information about the user could be obtained without effort on the user's part in the case that the user's media display device is equipped to capture images and relay information based on the images. In the case that the images are of the user, the images may be used to infer demographic information about the user without the need for effort by the user. On the basis of a user's inferred demographic information, video and media content for the user may be adjusted. Moreover, gathering demographic information and/or behavioral information regarding an identified demographic can further be used to create and/or update models on demographic preferences of particular media and advertisements.

As indicated previously, video or other media services can be provided by an MSP to users associated to the MSP. Examples of video services comprise television shows, movies, music videos, on-demand content, internet content and other image data. Examples of other media services comprise music and voice services. The term program will refer herein to either a particular instance of such video or media services, or to a group of such instances. For example, the term program may refer to one episode of a TV series, or to the series itself Examples of MSPs include terrestrial broadcasters, cable or DSL providers, and satellite network providers. Although embodiments are described in terms of an MSP performing certain functions, techniques disclosed herein can be applied by other entities. In some embodiments, for example, a third-party entity may collect and/or infer demographic information using the techniques described herein, and provide the information to an MSP or other entity.

Users of the MSP may receive programs and transmit information to the MSP by a variety of devices. Examples of devices comprise televisions, television display screen together with set-top boxes, desktop computers, laptop and tablet computers, smartphones, and other electronic devices. The communications between the MSP and the device may be by a physical connection such as a coax cable, Ethernet cable, phone line, fiber optic connection, and/or it may be by a radio connection such as an 802.11 wireless link or a cellphone connection.

In addition to being able to communicate with the MSP, devices may comprise a camera for acquiring images, including video images. A camera may be an integrated component of the device, or it may be an add-on component. A camera connected to the device may allow the device to acquire images of the user and transmit the images, or data from the images, over a communication link to the MSP. The MSP may use data from an image of the user to adapt program content transmitted to the user.

The term display device will refer herein to a device capable of showing image data and linked, either as a built-in component or as an add-on component, to at least one camera capable of capturing image data.

In an exemplary embodiment, a method is disclosed to infer demographic information about a user. Further embodiments are disclosed below. Examples of such demographic information comprise age, gender and ethnicity. The method comprises a first step of acquiring at least one image of the user from at least one display device. The at least one image may comprise a video sequence. The term image data is used herein to refer to any of: a single image frame, a plurality of single image frames, and a video image sequence. Data needed for inferring demographic information about the user is deduced from the image data. The term user data is used herein to refer to information inferred from image data of a user that is helpful for inferring demographic information about the user. The user data may comprise the image data as a whole, a part of the image data and/or values calculated from the image data. The user data may also comprise inferred actions of at least one user. The deduction of user data from the image data may occur at the display device or at the MSP. In this exemplary embodiment the entire image data is transmitted to the MSP where the user data is deduced from the image data. Examples of user data deduced from image data comprise location of the user's facial features, the user's hair and skin color, the user's height and body build, and actions performed by the user. Other user data may comprise information regarding a user's activities in relation to video content. The deduction of user data from image data may be implemented by a processing unit or an equivalent computer system at the MSP.

The method of the exemplary embodiment comprises a second step in which the user data deduced from the image data is analyzed by a comparison to known data about demographic types in populations as a whole. The term demographic type refers herein to a distinguishable subgroup of users of the MSP. The analysis step comprises accessing stored information regarding demographic types. As examples, the stored information may be accessible from a database maintained at the MSP, or locally saved on the display device. The comparison of a user data value with the stored information may comprise calculating an extent of similarity between a user data value with a range of values for a demographic type obtained from the stored information regarding demographic types. From the extent of similarity the analysis is able to determine a demographic type to which a user most likely belongs. Such an analysis and determination of a user's likely demographic type may be performed on a display device and the results transmitted to an MSP, or the analysis and determination may be done separately from the display device.

The method of the exemplary embodiment comprises a third step of providing demographic information that incorporates the determined demographic types of the user. The terms providing demographic information and providing demographic data will refer herein to various actions including, but not limited to, storing information, performing and storing statistical analyses of the information, and transmitting the information. In some embodiments, the demographic information may be provided to a software application, locally and/or remotely, via an application programming interface (API). The demographic information of the user that may be provided may comprise the specific demographic categories of the user, or may comprise statistical or other data derived from the demographic types of multiple users.

The exemplary method may be employed to adjust the programs transmitted by the MSP to the user, and/or gather information regarding the user's demographics. Exemplary adjustments comprise removing or not transmitting inappropriate content if minors are in the room and selecting advertisements more closely suited to the user's demographic types. For example, a Caucasian middle-age male user may be identified as such, and user preferences can be saved regarding his behavior. If, for instance, he commonly looks away or leaves the room during beer commercials, it can be determined that the user is not interested in beer commercials. When it is subsequently determined that the user is consuming content, the content (e.g., advertisements and/or media content) can be adjusted accordingly. Furthermore, his behavior can be transmitted to the MSP which can, using information about many (hundreds, thousands, millions, etc.) users to create and/or update demographic preference models. If, for example, the MSP receives data suggesting that many users of a particular demographic are not interested in car commercials, a demographic preference model can be updated accordingly.

FIG. 1 illustrates an exemplary system 100 in which a user 120 may consume media on at least one of several possible display devices. Though only one user and three display devices are illustrated, it is to be understood that there may be multiple users interacting with one or more display devices. The exemplary display devices shown comprise a television receiver 104, which may be coupled to a television display 106. The television receiver may be a separate piece of equipment or a component of the television display 106. The television receiver 104 may comprise a camera 102-1 for acquiring images, including images of users watching the television display 106; the camera 102-1 may either be a component of the television receiver 104 or an add-on device. The television receiver 104 may be connected to a communication link to send messages to the MSP. Examples of communication links comprise an internet connection, a land line phone connection, 802.11 wireless links and cell phone links.

Another of the exemplary display devices may be a laptop computer 115. The laptop computer 115 may comprise a camera 102-2 for acquiring images, including images of a user of the laptop. The camera 102-2 may either be a component of the laptop computer 115 or an add-on device. The laptop computer 115 may be connected to a communication link to send messages to the MSP. Examples of communication links for a laptop may comprise physical links and/or wired links. Examples of physical links comprise wires, cables, Ethernet cables, USB links, or other physical connections as known to one skilled in the art. Examples of wireless links comprise radio frequency communication technologies such as 802.11, ZigBee and Bluetooth. Other implementations of communication links are known to one of ordinary skill in the art.

Another of the exemplary display devices may be an image-capable smartphone 108. The smartphone 108 may have a built-in camera capable of capturing images, including video images. In some embodiments the smartphone may be able to connect through a communication link with the MSP by means of a cellphone radio link, an 802.11 wireless link and/or wired links. Other implementations of communication links are known to one of ordinary skill in the art.

A camera 102 comprises at least one lens and image capture component. An example of an image capture component is a charge coupled device. A camera 102 may comprise two subsidiary cameras or lenses, so as to produce images from which depth, stereoscopic information or other 3-dimensional information can be inferred. The camera 102 may be able to generate video sequences.

In the system 100 a display device may display image or video obtained transmitted from an MSP. The MSP may provide the image or video content by, for example, transmitting, hosting, and/or relaying the content, which may depend on the technologies utilized. The content may be communicated via terrestrial electromagnetic broadcasting, fiber optic, coax cable or DSL connections, and/or by transmission using satellites. Other transmission processes are apparent to one of skill in the art.

A display device and/or a device communicatively coupled therewith may be able to acquire an image data captured by a camera 102. Image data acquired by a display device may be transmitted by the display device to a storage media within itself, to the MSP over a communication link, or to another device for relay to the MSP. A communication link used to transmit image data to the MSP may be different from the communication link over which the device receives programs from the MSP.

Figure 2:
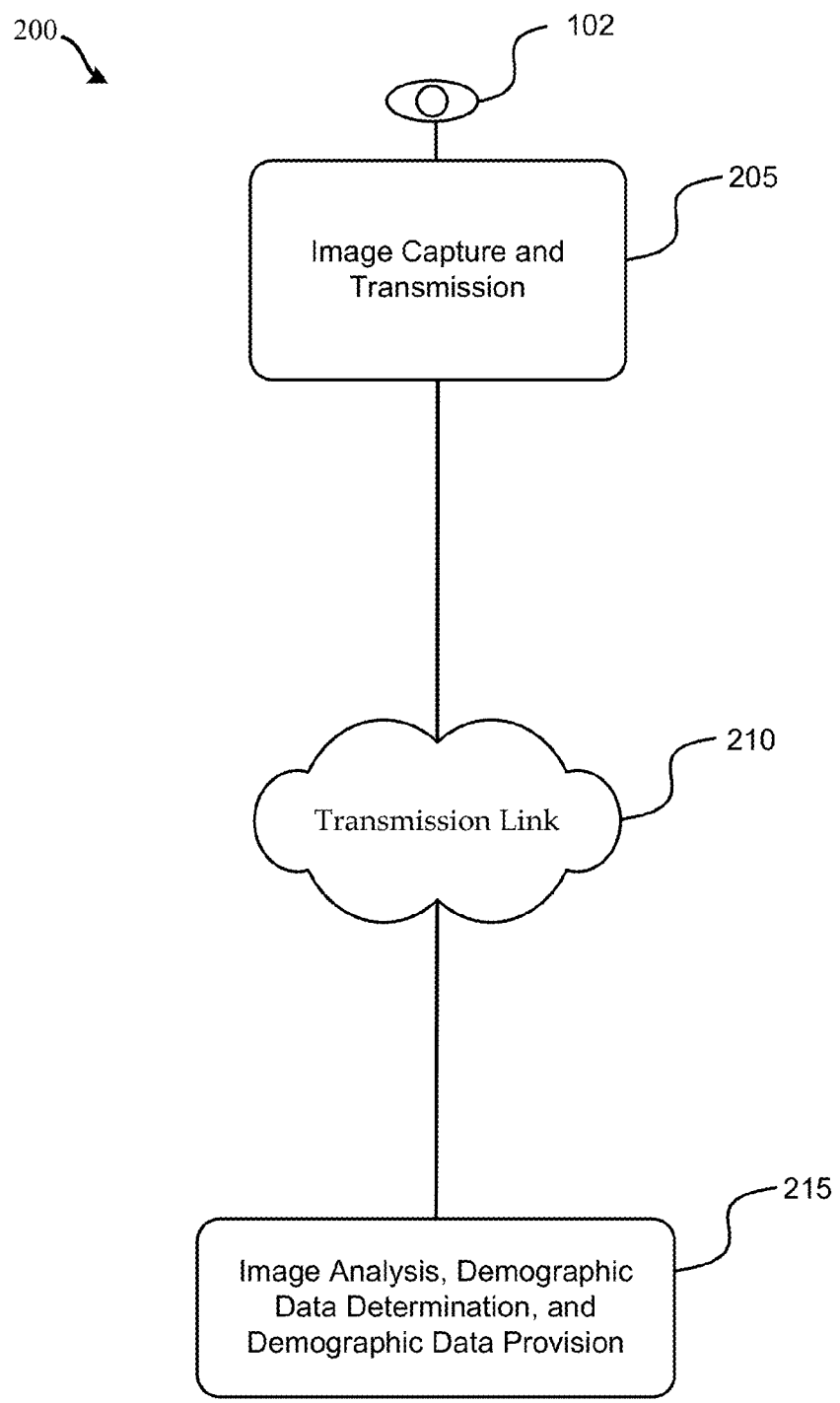
FIG. 2 illustrates a method for providing demographic information.

FIG. 2 illustrates a set of steps 200 of a method, and components used therein, for determining demographic information of a user 120, according to one embodiment. The camera 102 is configured to capture image data of at least one user 120 consuming media content. The camera 102 may be positioned so that the image data that is captured would implicitly contain at least one image or partial image of a user 120 consuming media content played back on a display device. As an example, the camera 102 could be located so that it points in the direction in which the display device is pointed.

In one embodiment, a user 120 of a display device may instruct the display device and/or MSP not to record image data of the user to maintain anonymity. In additional and alternate embodiments, the user 120 may edit which user data may be obtained from the image data.

The image data captured by the camera 102 is communicated to the display device to which it is connected, and the image data is transmitted 205 over a transmission link 210 to the MSP for image analysis and determination of the demographic data of the user. The image may be formatted into an appropriate format for ease of transmission. Examples of image formats comprise gif, jpeg, bmp, and mpeg. Other formats are apparent to one skilled in the art. Examples of the transmission link 210 comprise an internet link, a cellphone link, an Ethernet connection, or a wireless connection such as an 802.11 link with the display device. Other transmission links are apparent to one skilled in the art.

Once the image has been transmitted to the MSP, the MSP performs an image analysis 215 to obtain user data. Non-limiting examples of user data that may be inferred from image data comprise body height, body build, body profile, hair color, skin color, and facial features. Non-limiting examples of facial features comprise eye shape, and eye color, relative locations of facial features including nose, chin, cheekbones, lips and forehead. Still other non-limiting examples of user data include clothing color.

The user data inferred from the received image data may also comprise actions performed by the user 120. The user data may include a correlation of the user's actions with the displayed content on the display device. Non-limiting examples of user actions comprise skipping displayed content (and/or altering playback of content in other ways), exiting or entering the viewing area of the display device, closing the eyes, and turning and/or looking away from the display device.

The user data may comprise an organized database of quantifiable parameters inferred from the image data. The database may comprise the value of the parameter a range of probable values for the parameter, and a confidence interval for a parameter value. A non-limiting example of a parameter is a user body height, with a range indicating a 95% confidence interval. The parameters included in user data may also comprise correlation values of a user's attention with categories of displayed images. As a non-limiting example, a parameter can show a low correlation of user attention to advertisements for dresses, which could aid in determining that the user is male.

From the user data inferred from an image analysis of the image data, demographic data about the user 120 may be determined with varying degrees of confidence. As disclosed subsequently, demographic data about the user can be inferred by comparison with known information about the correlations of user data values with various demographic types.

The demographic data of a user 120 may then be stored or combined in a database with the demographic information of other users. Statistical analyses of combined user data may be performed by the MSP, and may be further provided to content providers and/or other entities. In some embodiments, individual user data or statistical data may be used by the MSP, or provided to another entity. The user data may be used to adjust the content of programs or advertisements transmitted to the user 120 and/or other users having the same or similar demographics.

Figure 3:
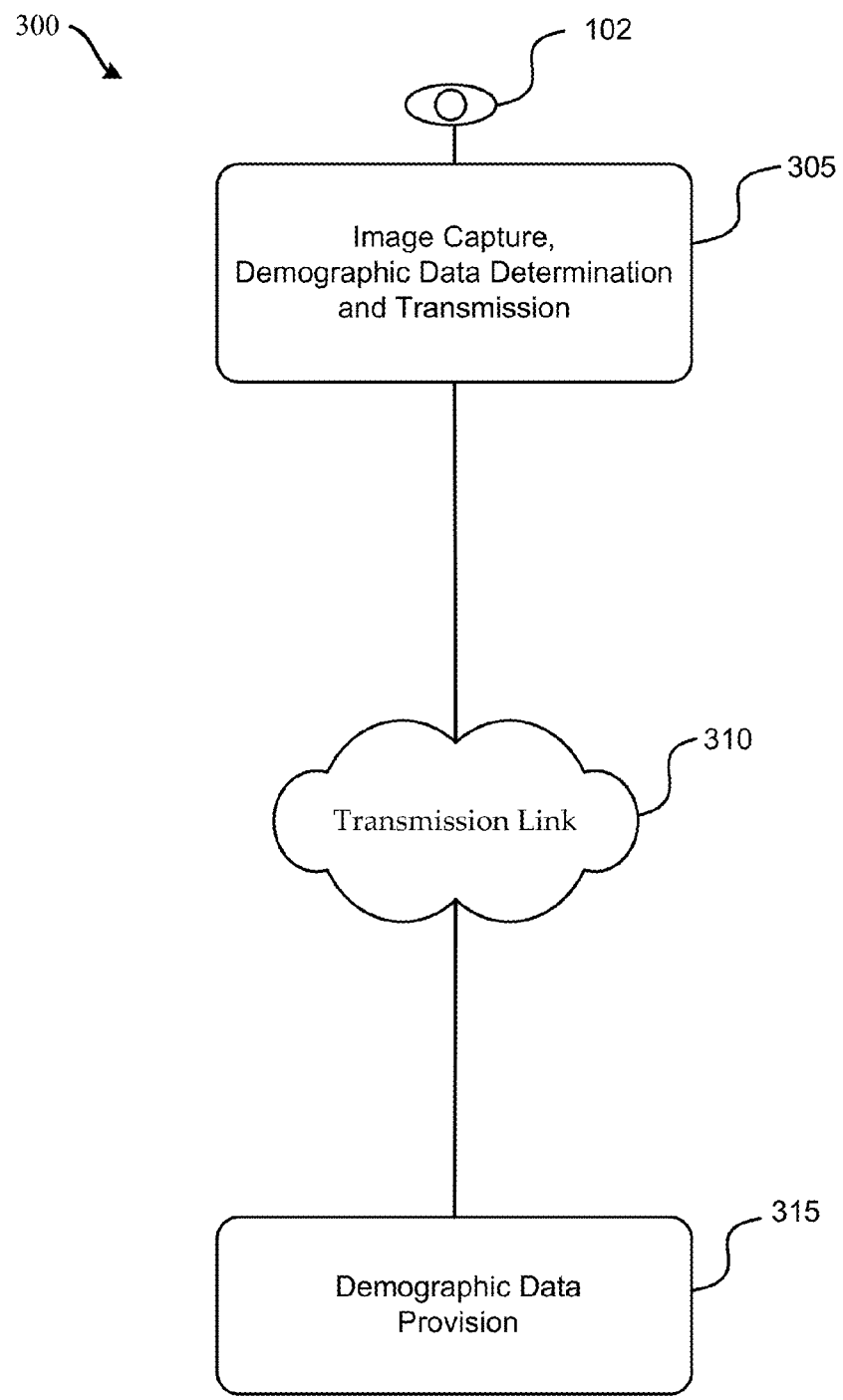
FIG. 3 illustrates a method for providing demographic information.
Figure 6:
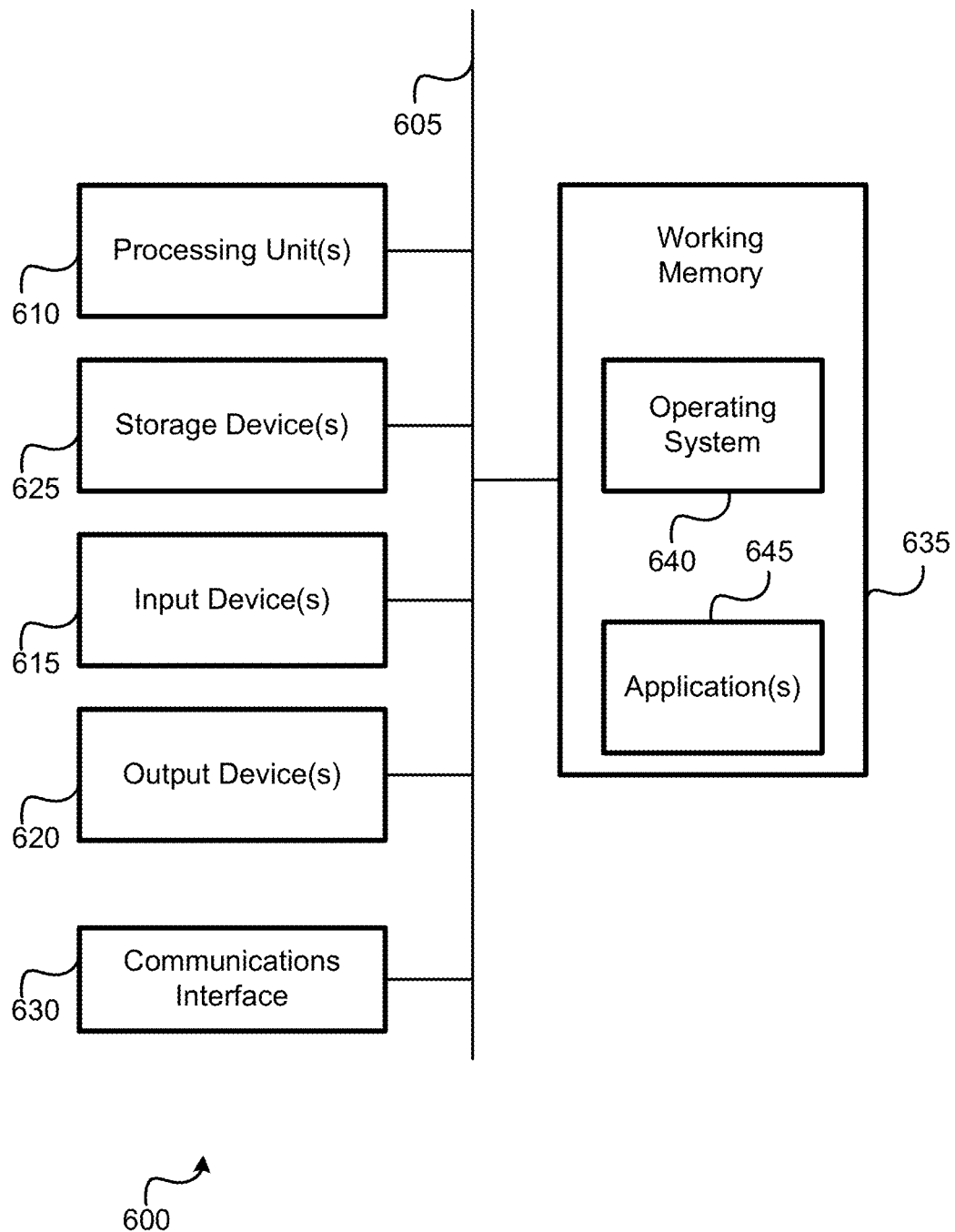
FIG. 6 illustrates an exemplary computer system.

FIG. 3 illustrates another embodiment of a set of steps 300 of a method, and components used therein, for determining demographic information of a user 120. In the embodiment shown, a camera 102 captures image data of a user or users of a display device. The display device and/or a device communicatively coupled therewith comprises a processing unit with sufficient processing capability to be able to obtain user data from the captured image data and infer demographic information 305 about a user or users. An example processing unit is provided in the description of a computer system as shown in FIG. 6 and explained subsequently.

The display device transmits the demographic data about the user over a transmission link 310 to an MSP. The MSP then provides demographic data 315, which may comprise storing the demographic data locally or remotely, performing statistical analyses of the user data, including combining the user data with other user data into one or more databases, and making the user data or the database information available. An aspect of providing demographic data 315 by the MSP is updating demographic data as more user data is received. The updating may be of demographic data of a particular user 120, and of stored information of regarding demographic types.

Figure 4:
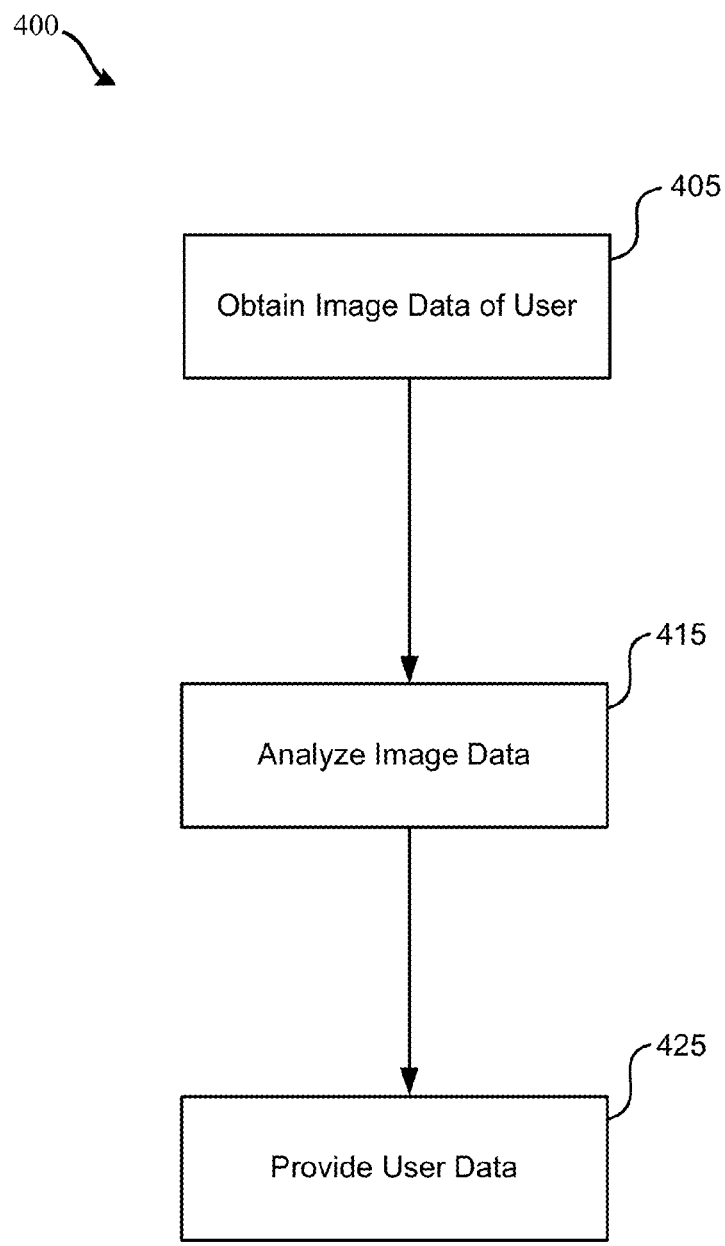
FIG. 4 illustrates steps in a method for obtaining demographic information.

The methods provided in FIGS. 3 and 4 are provided as examples only. Embodiments may include alternate features and/or may perform steps in a different order than shown. For example, a display device or device communicatively coupled therewith not only may communicate image data to an MSP (as discussed in FIG. 3), and/or communicate demographic data to an MSP (as discussed in FIG. 4), but additionally or alternatively may extract user data from image data and communicate the user data to the MSP, which can then determine the demographic data. A person of ordinary skill in the art will recognize many substitutions and other variations.

Depending on desired functionality, media servicing capabilities, and/or other factors, demographic determinations and/or changes in content may occur in real time, as the content is being consumed. For example, a display device may determine that a single user 120 is consuming media content. Identification and/or demographic information can be provided to the MSP, which can make advertisement calls to an ad server—while the media is being consumed—to tailor advertisements to that user. The advertisement calls can include, for example, a request for an advertisement, and an indication of a demographic of the user. The ad sever can then provide advertisements tailored for the indicated demographic. If multiple additional users are later determined to be consuming the media, the demographic information of the additional users (and/or of the collective group, which could be identified as a family) could then be provided to the MSP, which then makes advertisement calls to the ad server with the updated demographic information.

FIG. 4 illustrates an embodiment of a set of steps 400 by which user data is obtained from captured image data. The steps may be performed by a processing unit. An example of a processing unit provided in the description of a computer system as illustrated in FIG. 6, and explained subsequently. Other embodiments of a processing unit comprise application specific integrated circuits, field programmable gate arrays, and memory comprising code and data. In some embodiments the processing unit is within the display device. In other embodiments the processing unit located at the MSP and receives image data transmitted over a transmission link 210. In some embodiments, different steps may be performed by different processing units and/or different devices.

A variety of techniques may be used to analyze 415 the image data to obtain user data. In the non-limiting examples that follow, determination of a value may comprise finding a possible range for the value.

An aspect of an analysis of image data 415 comprises determination of a human body or bodies within a frame of the image data. Examples of data used to determine that a human body is in a frame comprise shapes, silhouettes, color patterns in the frame, "skeletons" (e.g., models outlining at least some of a body's separate moving parts) and/or other models describing one or more physical features of one or more users, and relative motion of parts of the frame compared to other frames in the image data. Basic image data processing techniques may be performed by a processing unit such as an image signal processor. More advanced image data processing (e.g., silhouettes, skeletons, motion, etc.) and be provided by specialized image processing devices, such as the Kinect® made by Microsoft Corporation of Redmond, Wash., and/or other image-sensing devices and peripherals.

An aspect of an analysis of image data 415 comprises using facial recognition methods to identify faces in an image frame. Non-limiting examples of data used in facial recognition comprise relative location to a recognized human body, particular relative patterns of key points such as eyes, nose, mouth and chin, and other techniques known to those skilled in the art.

An aspect of an analysis of image data 415 comprises determining a human body's height. Methods for inferring height include using body shape and distance. A body's distance may be inferred by use of a stereoscopic pair of cameras, triangulation from a plurality of cameras and the like.

An aspect of an analysis of image data 415 comprises determining hair or skin color. In the case that image data is only black and white, or grayscale data, hair and skin color may be inferred only to a limited extent.

Another step 425 in an analysis is to provide user data inferred from the image data. This may comprise ranking the user data according to certainty of the determined values, or by the ranking according to importance of the values for determination of a user's demographic type. Providing user data 425 may comprise transmitting the inferred user data to another processing unit or to another device for transmission or storage.

Figure 5:
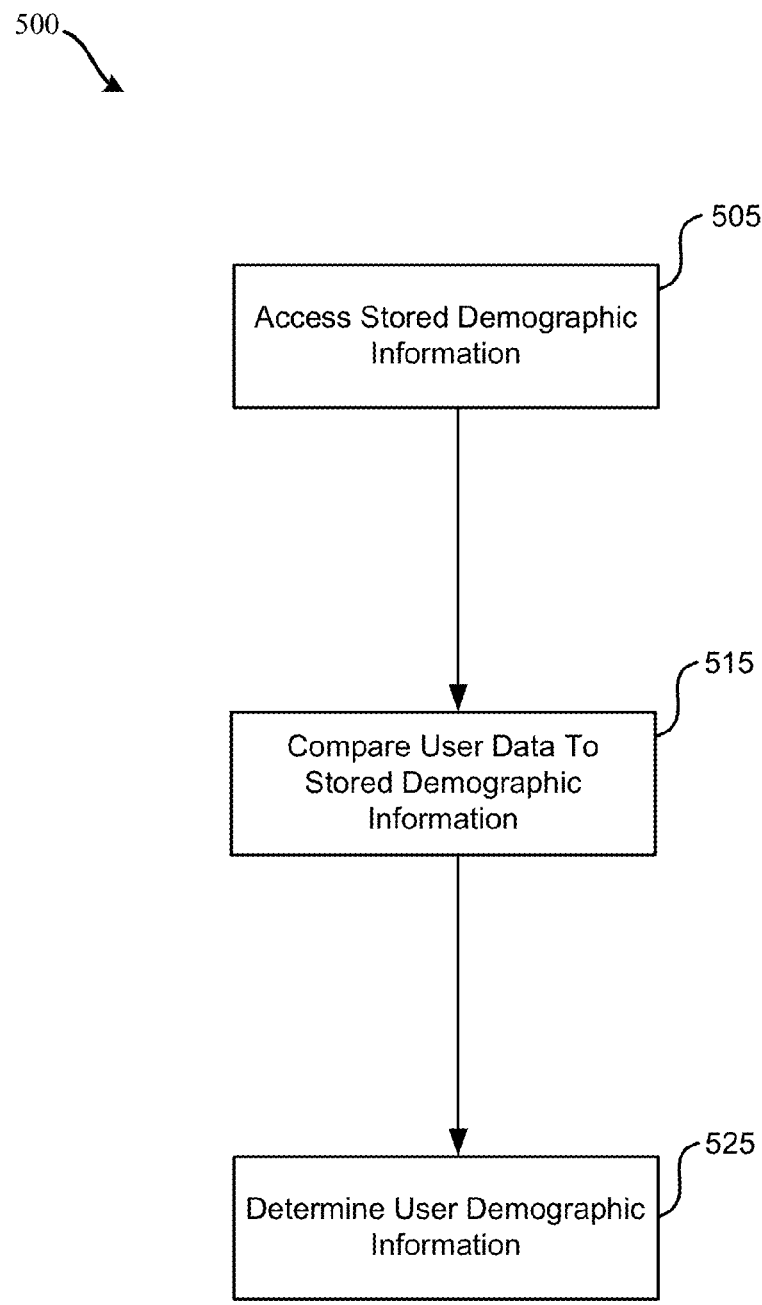
FIG. 5 illustrates steps for analyzing user data to obtain user demographic information.

FIG. 5 illustrates steps 500 used by some embodiments to analyze user data in order to determine a demographic type in which a user is most likely included.

The steps shown in FIG. 5 may be performed at the display device or at the MSP. The steps may be performed by a processing unit, such as the processing unit of the computer system as illustrated in FIG. 6, and explained subsequently.

A step in an analysis of user data is to access 505 stored information regarding demographic types. The term stored information will be used synonymously with stored information regarding demographic types. The stored information may comprise information regarding known variations of values of parameters that correspond to demographic types. Examples of parameters that may be useful in determining a demographic type comprise body build and body height, silhouette shape, hair and skin color, inferred clothing types, and relative location of facial features such as nose, eyes, forehead, chin, and cheekbones. Other measurable parameters are known to one skilled in the art. The stored information may comprise information about the relative importance of various sets of parameters for determining a demographic type.

The stored information may comprise correlation of user actions during certain categories of content with demographic types. Examples of user actions include types of ads watched or skipped, entering or leaving a display device's viewing area, or looking away from the display device.

The stored information may be accessed from storage media over a communication link. Examples of communication links include data buses, circuit connections, internet connections, Ethernet connections, wired connections, radio frequency links, and other communication links known to one of skill in the art. The storage media may comprise magnetic or optical disk storage, tape storage, and electronic memories such as random access memories and read-only memories. Other storage media are apparent to one of skill in the art.

Another step in an analysis is to compare 515 the user data to the stored information that has been accessed. A comparison may comprise calculating of how well one or more parameters of the user data lie within various ranges for the one or more parameters obtained from the stored information. In an exemplary embodiment, the calculation may measure how well the parameter value of eye separation is to a mean value of that parameter within a particular demographic type.

Another step in an analysis is to determine 525 user demographic information using the results of the comparison of the user data with the stored information. A determination may be made for a subset of possible demographic types of a user. In an exemplary embodiment, a determination may be made for just a user's gender and age.

In alternate and additional embodiments a multivariate analysis may be performed on values of parameters of the user data to make a determination regarding inclusion of a user in one or more demographic types. In an exemplary embodiment, parameter values for body height, body shape, eye separation and forehead to chin distance can be used together to give a more likely determination that a user has an age less than twenty than would be possible using only one of the parameters.

A confidence level may be part of a determination of a user's demographic type. In an example the determination may statistically yield, with 90% certainty, that the user is below age twenty.

A determination may conclude to a specified certainty that a user does not fall into a given demographic type.

A determination may be that the user is in a subset of the known demographic types. For example, it may be determined with high confidence that a user is likely a male with age in the range 20-30, but that ethnicity cannot be determined with high confidence from the user data.

A computer system as illustrated in FIG. 6 may be incorporated as part of any of the previously described elements. As non-limiting examples, the computer system 600 may be incorporated into and/or communicatively coupled with the television receiver 104, television display 106, laptop computer 115, smartphone 108, and the image capture system 102 of FIG. 1, as well as image relay devices and systems, image analysis devices and systems, databases of information regarding demographic types, devices or systems for providing demographic information, and/or other devices and systems as is clear to one of ordinary skill in the art. FIG. 6 provides a schematic illustration of one embodiment of a computer system 600 that can perform steps of the methods described herein, including methods shown in FIGS. 2-5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A method of providing demographic information regarding one or more users of a display device, the method comprising:
    obtaining image data of the one or more users by a camera communicatively linked with the display device, wherein the image data is obtained while certain content is being displayed on the display device;
    obtaining user data from the image data of at least one user of the one or more users, the user data comprising a first set of quantifiable parameters inferred from the image data;
    determining a behavior of the at least one user from the image data obtained while the certain content is being displayed on the display device;
    analyzing the user data and the determined behavior with a processing unit, wherein analyzing the user data and the determined behavior includes:
        accessing stored information regarding a plurality of known demographic types;
        correlating the determined behavior with the certain content;
        inferring a second set of quantifiable parameters from the correlated determined behavior;
        ranking the user data and the correlated determined behavior according to a confidence level of the inferred first set and second set of quantifiable parameters, the confidence level being based on a range of probable values for each inferred quantifiable parameter corresponding to a confidence interval; and
        comparing the ranked user data and correlated determined behavior to the stored information regarding the plurality of known demographic types;
    determining, for the at least one user of the one or more users, a particular demographic type based on the comparison of the ranked user data and correlated determined behavior to the stored information; and
    providing demographic information incorporating the determined particular demographic type of the at least one user.

2. The method of providing the demographic information regarding the one or more users of the display device recited in claim 1, wherein determining the behavior of the at least one user comprises determining that the at least one user performs at least one of the following actions while the display device displays the certain content:
    looks away from viewing the display device,
    exits a viewing area of the display device,
    enters a viewing area of the display device, or
    alters playback of the certain content.

3. The method of providing the demographic information regarding the one or more users of the display device recited in claim 1, further comprising updating the stored information based on the demographic information.

4. The method of providing the demographic information regarding the one or more users of the display device recited in claim 3, wherein the stored information includes information regarding at least one of:
    the at least one user, or
    the determined particular demographic type of the at least one user.

5. The method of providing the demographic information regarding the one or more users of the display device recited in claim 3, further comprising sending the updated stored information to a server via a data communication network.

6. The method of providing the demographic information regarding the one or more users of the display device recited in claim 1, wherein providing the demographic information comprises sending the demographic information to a server via a data communication network.

7. The method of providing the demographic information regarding the one or more users of the display device recited in claim 1, wherein providing the demographic information comprises sending the demographic information via an Application Programming Interface (API).

8. The method of providing the demographic information regarding the one or more users of the display device recited in claim 1, wherein the user data comprises information indicative of at least one of:
    a color image of the one or more users,
    a silhouette of the one or more users, or
    a model describing one or more physical features of the one or more users.

9. The method of providing the demographic information regarding the one or more users of the display device recited in claim 1, wherein the demographic information includes information based on at least one of:
    a gender,
    an age, or
    an ethnicity.

10. A system of providing demographic information regarding one or more users of a display device, the system comprising:
    one or more processors;

non-transitory storage media communicatively coupled with and readable by the one or more processors and comprising instructions, which when executed by the one or more processors, cause the one or more processors to:
  obtain image data of the one or more users by a camera communicatively linked with the display device, wherein the image data is obtained while certain content is being displayed on the display device;
  obtain user data from the image data of the one or more users, the user data comprising a first set of quantifiable parameters inferred from the image data;
  determine a behavior of the at least one user from the image data obtained while the certain content is being displayed on the display device;
  analyze the user data using the one or more processors, wherein analyzing the user data includes:
    accessing stored information regarding a plurality of known demographic types;
    correlating the determined behavior with the certain content;
    inferring a second set of quantifiable parameters from the correlated determined behavior;
    ranking the user data and the correlated determined behavior according to a confidence level of the inferred first set and second set of quantifiable parameters, the confidence level being based on a range of probable values for each inferred quantifiable parameter corresponding to a confidence interval; and
    comparing the ranked user data and correlated determined behavior to the stored information regarding the plurality of known demographic types;
  determine, for the at least one user of the one or more users, a particular demographic type based on the comparison of the ranked user data and correlated determined behavior to the stored information; and
  provide demographic information incorporating the determined particular demographic type of the at least one user.

11. The system for providing the demographic information regarding the one or more users of the display device recited in claim 10,
  wherein determining the behavior of the at least one user comprises determining that the at least one user performs at least one of the following actions while the display device displays the certain content:
    looks away from viewing the display device,
    walks away from the display device,
    enters a viewing area of the display device, or
    alters playback of the certain content.

12. The system of providing the demographic information regarding the one or more users of the display device recited in claim 10, further comprising code that causes the one or more processors to update stored information based on the demographic information regarding the one or more users.

13. The system for providing the demographic information regarding the one or more users of the display device recited in claim 10, wherein the user data obtained from the image data of the one or more users comprises information indicative of at least one of:
  a color image of the one or more users,
  a silhouette of the one or more users, or
  a model describing one or more physical features of the one or more users.

14. The system for providing the demographic information regarding the one or more users of the display device recited in claim 10, wherein the demographic information incorporating the particular determined demographic type includes information based on at least one of:
  a gender,
  an age, or
  an ethnicity.

15. The system of providing the demographic information regarding the one or more users of the display device recited in claim 10, further comprising sending the demographic information to a server via a data communication network.

16. The system of providing the demographic information regarding the one or more users of the display device recited in claim 10, wherein providing the demographic information comprises sending the demographic information via an Application Programming Interface (API).

17. A computer program product embodied on a non-transitory computer-readable medium and comprising code that, when executed, causes one or more processors in a display device to:
  obtain image data of one or more users by a camera communicatively linked with the display device, wherein the image data is obtained while certain content is being displayed on the display device;
  obtain user data from the image data of the one or more users, the user data comprising a first set of quantifiable parameters inferred from the image data;
  determine a behavior of the at least one user-from the image data obtained while the certain content is being displayed on the display device;
  analyze the user data with the one or more processors, wherein analyzing the user data includes:
    accessing stored information regarding a plurality of known demographic types;
    correlating the determined behavior with the certain content;
    inferring a second set of quantifiable parameters from the correlated determined behavior;
    ranking the user data and the correlated determined behavior according to a confidence level of the inferred first set and second set of quantifiable parameters, the confidence level being based on a range of probable values for each inferred quantifiable parameter corresponding to a confidence interval; and
    comparing the ranked user data and correlated determined behavior to the stored information regarding the plurality of known demographic types;
  determine, for the at least one user of the one or more users, a particular demographic type based on the comparison of the ranked user data and correlated determined behavior to the stored information; and
  provide demographic information incorporating the determined particular demographic type of the at least one user.

18. The computer program product embodied on a non-transitory computer-readable medium of claim 17,
  wherein determining the behavior of the at least one user comprises determining that the at least one user performs at least one of the following actions while the display device displays the certain content:
    looks away from viewing the display device,
    exits a viewing area of the display device,
    enters a viewing area of the display device, or
    alters playback of the certain content.

19. The computer program product of claim 17, wherein the user data comprises information indicative of at least one of:

a color image of the one or more users,
a silhouette of the one or more users, or
a model describing one or more physical features of the one or more users.

20. The computer program product of claim 17, wherein the demographic information includes information based on at least one of:
a gender,
an age, or
an ethnicity.

* * * * *